United States Patent Office 3,021,675
Patented Feb. 20, 1962

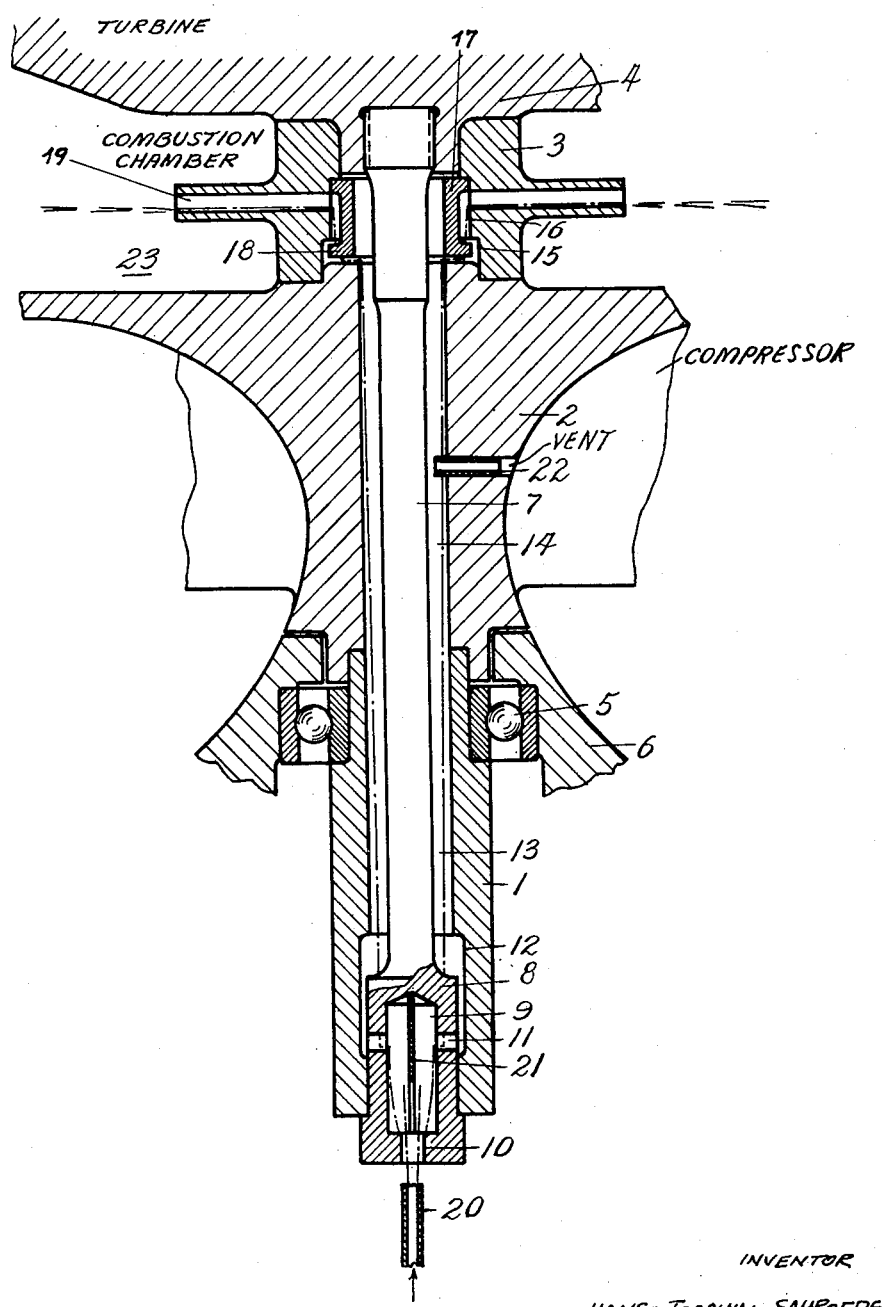

3,021,675
FUEL SUPPLY SYSTEM FOR GAS TURBINES
Hans Joachim Schroeder, Munich, Germany, assignor to BMW Triebwerkbau Gesellschaft m.b.H., Munich, Germany
Filed Mar. 15, 1960, Ser. No. 15,180
Claims priority, application Germany May 22, 1959
17 Claims. (Cl. 60—39.74)

The present invention relates to a fuel supply system in gas turbines provided with a rotary atomization of the fuel in which the supply of fuel takes place through a hollow turbine shaft which may be arranged vertically, horizontally, or at any other angular inclination in space.

The basic principle applied to the fuel supply system in accordance with the present invention, namely the utilization of the formation of the paraboloid of revolution of a rotating fluid is known per se in connection with other devices. For example, the application of this principle is utilized in connection with the supply of a lubricant for the bearing places of vertically arranged shafts in which the accommodation of contact seals between the stationary lines and the shaft rotating at relatively high speeds entails difficulties. However, the application of this principle to the supply of fuel in hollow rotor shafts of gas turbines with rotary atomization, particularly of hollow shafts in which the fuel does not flow by gravitational forces, is novel, the more so as special problems arise in connection with such fuel supply systems which are peculiar thereto and are distinct from those normally encountered and expected in lubricating supply systems.

For example, to mention but a few of these special problems, the formation of an excess pressure within the interior space of the rotating annularly-shaped fuel column would result in pushing back the fuel paraboloid of revolution and thereby causing the fuel to drain out of the hollow shaft. Since the discharge of the fuel with a centrifugal atomization takes place by means of a hollow atomizer disk provided with open nozzles, it becomes necessary to close off the interior space against the combustion chamber pressure for the successful operation of the fuel system in accordance with the present invention. On the other hand, a closure or effective seal has to be provided also at the inlet side of the hollow shaft in order to prevent the admission of any fresh air into the supply space and therewith the possible formation therein of a combustible mixture. Further, the application of this principle to fuel supply systems for gas turbines, in accordance with the present invention, requires that the fuel vapors which may occur at the hot end of the inner space be conducted away through the wall of the rotating, annularly-shaped liquid column.

The present invention solves the problems mentioned hereinabove, which are peculiar to a fuel supply system for gas turbines having a hollow rotor shaft arranged for the supply of fuel therethrough, by the subdivision of the supply distance or path into at least three sections disposed one adjacent the other and provided with diameters increasing in the direction of flow of the fuel and which are separated from each other by a liquid barrier or seal whereby the inner space of the rotating, annularly-shaped liquid column is in communication with the atmosphere or with an underpressure by appropriate means.

The liquid barriers or seals, in accordance with the present invention, are formed in recesses provided within the shaft bore into which engage the inserts provided with collar portions and within which simultaneously takes place the change in diameter. For that purpose, the outer diameter of the collar portion is equal to or larger than the succeeding paraboloid diameter.

In one preferred embodiment according to the present invention, the inner space of the rotating, annularly-shaped liquid column is in communication with the suction side of the compressor through a venting system disposed between the places of the two liquid barriers or seals, whereby the compressor rotor is provided with a radial bore into which is inserted a small tube extending through the wall of the annularly-shaped liquid column toward the inside thereof.

Accordingly, it is an object of the present invention to provide a fuel supply system for a gas turbine having a hollow rotor shaft arranged for the supply of fuel therethrough, which is reliable in operation, simple in structure and which fulfills all the requirements in a most appropriate and advantageous manner.

Another object of the present invention is the provision of a fuel supply system for a turbine installation with a hollow rotor shaft which utilizes the principle of a paraboloid of rotation as applied to an annularly-shaped liquid column building up within the hollow shaft of the turbine.

Still a further object of the present invention resides in the provision of a fuel supply system for a gas turbine provided with a hollow rotor shaft which utilizes the principle of the paraboloid of revolution as applied to a liquid column building up within the shaft and which simultaneously therewith prevents effectively the formation of any combustible mixtures within the hollow shaft by barring the admission of air at the input side of the fuel supply system, and which also effectively prevents any effect of the pressure existing within the combustion chamber from effecting the liquid column within the shaft.

Still another object of the present invention resides in the provision of liquid barriers or seals suitable for the present invention by simple means.

These and other objects, features and advantages of the present invention will become more obvious from the following description, when taken in connection with the accompanying drawing which, in the single figure thereof, shows, for purposes of illustration only, one embodiment in accordance with the present invention. Even though, in the preferred embodiment, the hollow turbine or rotor shaft is shown in a vertical position, it should be understood that it may be arranged in any other suitable position, for example, horizontally or obliquely.

Referring now to the drawing which illustrates a partial, axial cross-sectional view through a turbine in accordance with the present invention, and more particularly, a partial longitudinal cross-section through the rotor of a small turbine, the rotor unit illustrated in this figure essentially consists of a rotatable shaft 1, of a compressor rotor 2, of an atomizer disk 3 and of a turbine rotor 4, which shaft 1 is suitably supported within the housing 6 by means of one or several roller bearings 5 or of any other appropriate anti-friction bearing. The individual rotor parts of the turbine are assembled adjacent one another by appropriate centering parts and are kept together by means of tightening bolt member 7. The tightening bolt member 7 may be provided in the lower part thereof with a collar portion 8 enclosing therewithin a space 9 which itself is open at the bottom thereof through a bore 10 extending in the axial direction and which, in the upper part thereof, is provided with one or several radially directed bores 11 discharging into a recess 12 provided within hollow shaft 1.

The bore 13 of shaft 1 is continued in the upward direction by a bore of the same size or a larger bore 14 provided within the compressor rotor 2 and terminates in a recess 15 provided within the atomizer disk 3. An annular member 17 of essentially U-shape in longitudinal cross-section is arranged within the bore 16 adjoining the recess 15 while annular member 17 is retained with the upper collar portion thereof within bore 16 by means of a tight- or press-fit and with the lower collar portion 18 extending or projecting into the recess 15. A plurality of open nozzle bores 19 lead from the annular space formed by the annular member 17 within the bore 16 in the radial direction thereof into a combustion chamber of suitable construction (not illustrated in detail in the drawing). The structure just described thus comprises a hollow bore gas turbine structure which includes the hollow shaft 1.

*Operation*

The operation of the fuel supply system in accordance with the present invention is as follows:

The fuel is supplied by a fuel supply pump (not illustrated) of any known construction, in an amount corresponding to the required output, from the end of the stationary line 20 constructed as nozzle, for example, in a free jet through the bore 10 of the rotating shaft 1 into the space 9 thereof. However, according to a modification within the scope and spirit of the present invention, instead of the free jet, the orifice portion of the line 20 may also be extended contact-free through the bore 10 into the space 9.

Under the influence of the centrifugal force, the fuel will rise along the walls of the space 9 and eventually will flow out through the radial bores 11 into the recess 12. The same operation repeats itself in the bores 13 and 16 over recess 15 so that the fuel finally is supplied into the combustion chamber through bores 19.

It should be noted in connection with the configuration of the outer contour of the rotating, annularly-shaped liquid column that the diameter of each section has to increase in the direction of flow of the supplied fuel in such a manner that the paraboloid of rotation on the respective section or step thus formed can maintain itself and that therebeyond it has a sufficient excess in rising head in order to supply the fuel into the next larger bore. For purposes of speeding up the conversion of the fuel jet injected through the bore 10 into the rotary movement thereof, a stream or jet distributor 21 may be arranged within bore 9 which effectively breaks up the jet or stream.

The collar portion 18 of the insert member 17 extends into the recess 15 in such a manner that the rotating fuel forms an effective liquid seal or barrier against the overpressure prevailing in the combustion chamber. A similar liquid seal or barrier provided on the inlet side of the fuel supply system against the admission of fresh air is formed by the recess 12 with cooperation of the stepped portion 8 of the tightening bolt member 7. In order to keep the interior space of the liquid annulus between the two liquid seals or barriers as free as possible from any overpressure caused by the evaporating fuel, the wall of the compressor rotor 2 is provided with a bore into which is inserted a short tubular member 22 which extends inwardly through the liquid wall formed along the bore 1 and therewith places into communication the internal space thereof with the suction side of the compressor 2.

While I have shown and described one embodiment in accordance with the present invention, it is understood that the present invention is not limited thereto but is susceptible of many changes and modifications within the spirit and scope of the present invention and I, therefore, do not wish to be limited to the particular details shown and described herein, but intend to cover all such changes and modifications as are encompassed by the scope of the appended claims.

I claim:

1. A fuel supply system within a hollow bore gas-turbine structure including a hollow shaft utilizing the formation of a paraboloid of rotation of a rotating liquid comprising means forming within said rotating structure a plurality of sections one adjacent the other and having each an increased diameter in the direction of flow of the fuel, liquid seal means separating at least some of said sections from each other, and means for venting the internal space of the rotating, annularly-shaped liquid column building up within said shaft.

2. A fuel supply system according to claim 1, wherein said liquid seal means are formed by recesses provided within said hollow bore gas-turbine structure, and insert means extending into said recesses and forming thereby effectively said liquid seals, the changes in diameter also taking place simultaneously at said insert means.

3. A fuel supply system according to claim 2, wherein the diametric dimension of each insert means disposed within a respective recess is at least equal to the outer diameter of the next-following paraboloid.

4. A fuel supply system according to claim 3, wherein said means adapted to place the internal space of the rotating annularly-shaped liquid column building up within said structure into communication with a pressure includes tubular means intermediate said liquid seal means provided within said structure and extending inwardly through the liquid column wall building up within said structure, said tubular means being in communication with the suction side of the gas-turbine compressor.

5. A fuel supply system according to claim 1, wherein said gas-turbine structure is operative to drive also the compressor rotor of the turbine unit, and wherein said last-mentioned means includes tubular means in communication with the suction side of the compressor and extending radially inwardly into the space within said structure.

6. A fuel supply system within a hollow bore gas-turbine structure including a hollow shaft utilizing the formation of the paraboloid of rotation of a rotating liquid, comprising means forming within said rotating structure at least three subsequent sections having an increasing diameter from one section to the other in the direction of flow of the fuel, liquid seal means effectively separating said three sections from each other, and venting means placing the internal space of the rotating annularly-shaped liquid column into communication with a pressure substantially less than the pressure prevailing in the combustion chamber of the turbine during operation.

7. A fuel supply system according to claim 6, wherein said venting means places the internal space of the rotating annularly-shaped liquid column into communication with the atmosphere, said venting means comprising bore means in said hollow structure.

8. A fuel supply system according to claim 6, wherein said venting means comprises means for placing the internal space of the rotating annularly-shaped liquid column into communication with an underpressure, said turbine comprising means for creating said underpressure.

9. A fuel supply system according to claim 6, wherein said hollow bore gas turbine structure is provided with recesses in the bore thereof, and shaft collar portions extending into said recesses, said liquid seal means being formed effectively by said recesses and collar portions, and the changes in diametric dimensions also taking place at said collar portions.

10. A fuel supply system according to claim 9, wherein the diametric dimension of the collar portion within a respective recess is at least equal to the outer diameter of the next-following paraboloid within said shaft bore.

11. A fuel supply system according to claim 10, wherein said venting means includes a tubular member inserted into said structure intermediate two liquid seal means and extending inwardly through the liquid column wall, said tubular member being in communication at the radially outer end thereof with a source of underpressure.

12. A fuel supply system according to claim 6, further comprising compressor means having a suction and a pressure side, and wherein said venting means extends through said structure with the radially inner end extending through the liquid column wall building up within said structure and with the radially outer end thereof in communication with said suction side.

13. A fuel supply system according to claim 6, wherein said structure is effectively formed of a plurality of sections provided with mutually complementary centering means, tightening bolt means for pressing the outer sections of said structure toward each other and therewith assembling said sections into a unitary structure, the lower end of said tightening bolt means enclosing therewithin a hollow space, an aperture provided at the lower end of said tightening bolt means to provide a communication between the space and the outside thereof, and radial bores providing a communication between said space and the shaft bore of said hollow shaft, and means for supplying fuel into said space through said aperture.

14. A fuel supply system according to claim 13, further comprising means for breaking up the flow of injected fuel injected into said space through said aperture.

15. A fuel supply system according to claim 14, wherein one of said liquid seal means is formed by a recess provided in said hollow shaft, and a collar portion extending into said recess and being formed by the lower enlarged end of said tightening bolt means.

16. A fuel supply system according to claim 1, wherein said sections having each an increased diameter in the direction of fuel flow are respectively disposed in positions in which the one of said sections having the greatest diameter is at a level higher than the others of said sections, the lowermost of said sections intially receiving said fuel.

17. A fuel supply system according to claim 6, wherein said three subsequent sections are disposed vertically one above the other, the one of said sections having the greatest diameter being disposed at a level higher than the others of said sections, and means providing communication from the said one of said sections to said combustion chamber.

References Cited in the file of this patent

UNITED STATES PATENTS

| | | |
|---|---|---|
| 2,795,109 | Hryniszak | June 11, 1957 |
| 2,861,425 | Williams | Nov. 25, 1958 |
| 2,924,937 | Leibach | Feb. 16, 1960 |